United States Patent [19]

Davis et al.

[11] Patent Number: 4,836,308
[45] Date of Patent: Jun. 6, 1989

[54] HIGHLY ACCURATE PLATFORM WEIGHING SYSTEM

[75] Inventors: Dick E. Davis; Charles R. Brazell, both of Arlington; Jerome E. Johnston, Austin, all of Tex.

[73] Assignee: General Electrodynamics Corporation, Arlington, Tex.

[21] Appl. No.: 177,183

[22] Filed: Apr. 4, 1988

[51] Int. Cl.[4] .................. G01G 23/01; G01L 25/00
[52] U.S. Cl. .................................. 177/25.14; 177/50; 73/1 B
[58] Field of Search ............. 177/25.14, 50, 210 FP; 73/1 B

[56] References Cited

U.S. PATENT DOCUMENTS 4,693,330 9/1987 Uchimura et al. ............... 177/25.14
4,703,815 11/1987 Hirano et al. ...................... 177/50 X Primary Examiner—George H. Miller, Jr.
Attorney, Agent, or Firm—Baker, Mills & Glast

[57] ABSTRACT

A platform weighing system (10) suitable for making accurate weight measurements of heavy objects, such as aircraft, is disclosed. Hardware and software combine to produce the accurate results. Analog hardware (14) includes hydraulic load cells (80a-80d), temperature sensing (91), filtering (90), and voltage-to-frequency conversion (104). Digital hardware (12) receives an oscillation signal output from the voltage-to-frequency conversion (104) and obtains load counts by monitoring the oscillation signal for consistent predetermined durations. The predetermined duration is chosen in software (226) to be immune to particularly pervasive noise signals. A microprocessor (16) converts load counts into a weight code which is output to a display (46). This conversion includes compensation for auto ranging (320), load cell excitation variance (282), temperature compensation (284), null offset variance (286), and zero drifting (304). In addition, nonlinearities in load cell output are compensated by linearly interpolating (288–296) between two of a plurality of calibration points that characterize the load cells (80a-80d). Such compensations are performed primarily in software (200).

22 Claims, 5 Drawing Sheets

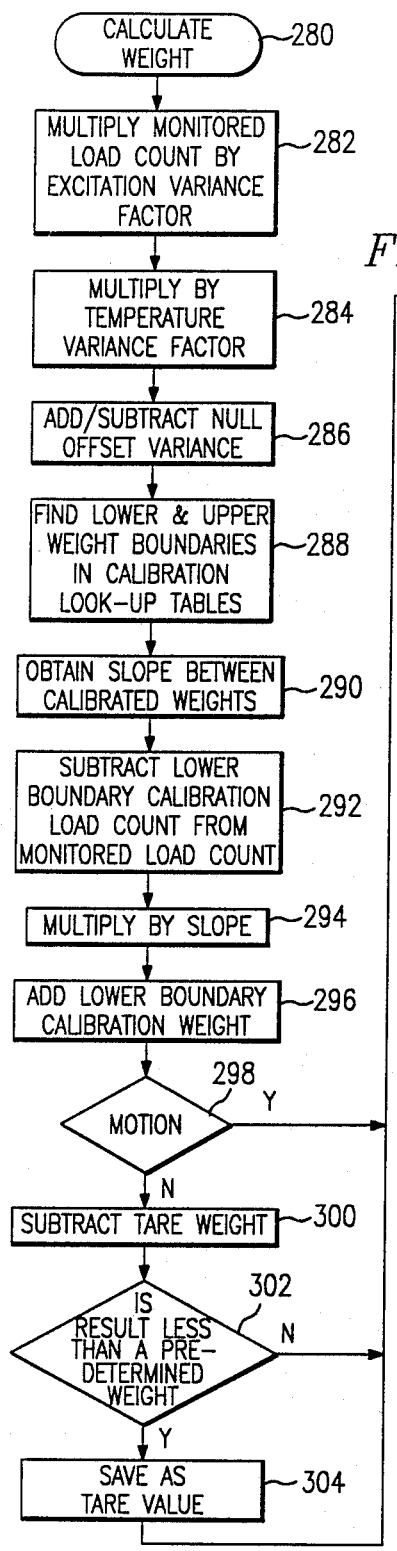
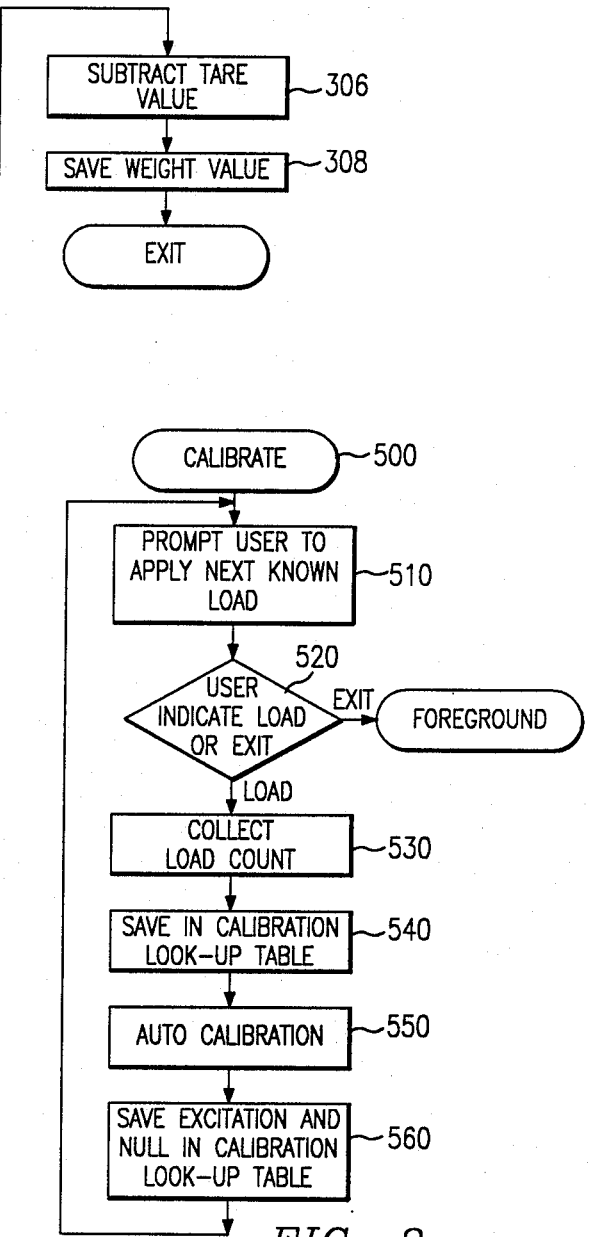
FIG. 6
FIG. 8

HIGHLY ACCURATE PLATFORM WEIGHING SYSTEM

TECHNICAL FIELD OF THE INVENTION

The present invention generally relates to weight measurement systems. More specifically, the present invention relates to such systems which weigh heavy objects, such as aircraft.

BACKGROUND OF THE INVENTION

Aircraft and other large objects must occasionally be weighed. The weighing procedure typically utilizes a plurality of load cells upon which the entire weight of the object collectively rests. The load cells couple to transducers which provide electrical signals. These electrical signals may be measured, and the electrical measurements may be converted into a weight. The sum of weights resulting from outputs measured at each of the plurality of load cells equals the total weight of the object. In addition, the individual weights are useful in calculating center of gravity parameters.

A platform weighing system provides one conventional solution to the problems posed in weighing aircraft or other large objects. In using platform systems, the object is rolled onto a plurality of platforms. Typically, one platform resides under each of the object's wheels. Each platform contains at least one load cell which senses weight applied to the platform.

However, conventional platform weighing systems fail to accurately weigh such objects in the field environments within which such systems are often used. One problem concerns the application of side loads to the load cells which measure the object's weight. Such side loads may be caused by a less than precisely level surface upon which the platforms are being used, or they may be caused by various mechanical configurations of landing gear or other wheel support structures. Consequently, if side loads are not adequately tolerated, weight measuring accuracy diminishes. For example, although a strain gauge type of load cell is known to provide a highly accurate output when not subjected to side loads, the application of a side load so severely and detrimentally influences such a load cell's output signal that a highly accurate measurement is not attainable.

Moreover, such platform weighing systems tend to operate in electrically noisy environments and over a wide variation in temperature. The electrical circuits used to measure load cell output signals in conventional platform weighing systems are so influenced by noise, the environment, temperature, and the like, that they fail to achieve acceptable accuracies.

Thus, a need exits for an improved platform weighing system which produces highly accurate measurements in spite of side loads or external influences on electrical circuits.

SUMMARY OF THE INVENTION

Accordingly, it is an advantage of the present invention that an improved platform weighing system that utilizes hydraulic load sensing to minimize the influence of side loads is provided.

Another advantage of the present invention concerns providing an improved architecture for electrical circuits in a platform weighing system so that highly accurate and repeatable weight measurements result.

The above and other advantages of the present invention are carried out in one form by a system that indicates an object's weight. The system includes a device which senses the object's weight and provides an analog signal which has an amplitude proportional to the weight. A conversion device couples to the sensing device so that the analog signal is converted into an oscillation signal having a frequency which is proportional to the weight. A counter couples to the conversion device to monitor the oscillation signal and provide a monitored load count which is proportional to the weight. A computing device couples to the counter and converts the monitored load count into a weight code which describes the weight. A display also couples to the computing device, receives the weight code, and converts the weight code into a humanly perceptible indication of the weight.

In addition, a memory couples to the computing device. The memory stores a program which the computing device executes and a table that contains a predetermined number of calibration load counts. Each of the calibration load counts has a calibration weight associated therewith. The program stored within the memory is configured to cause the computing device to generate the weight code based upon an interpolation between two of the calibration weights. The two calibration weights used in the interpolation are selected so that one of the weights is greater than the monitored load count and the other of the weights is less than the monitored load count.

BRIEF DESCRIPTION OF THE DRAWINGS

A more complete understanding of the present invention may be derived by referring to the detailed description and claims when considered in connection with the figures, wherein like reference numbers refer to similar items, and:

FIG. 6 shows a simplified flow chart of a Calculate Weight routine shown in FIG. 3;

FIG. 8 shows a simplified flow chart of tasks performed by the microprocessor in the preferred embodiment of the present invention when the microprocessor executes a program in a Calibrate mode.

DETAILED DESCRIPTION OF THE PREFERRED EMBODIMENT utilized in a preferred embodiment of a weighing system 10. FIG. 1 shows a digital portion 12 of system 10, and FIG. 2 shows an analog portion 14 of system 10. Referring to FIG. 1, digital portion 12 includes a microprocessor 16. In the preferred embodiment, an 8OC3l single-chip, microprocessor manufactured by the Intel Corporation and others is utilized for microprocessor 16. Thus, microprocessor 16 contains computing circuits 18, which couple to on-chip random access memory (RAM) 20, and two programmable counters, referenced as counter 22 and timer 24 in FIG. 1.

Figure 1:
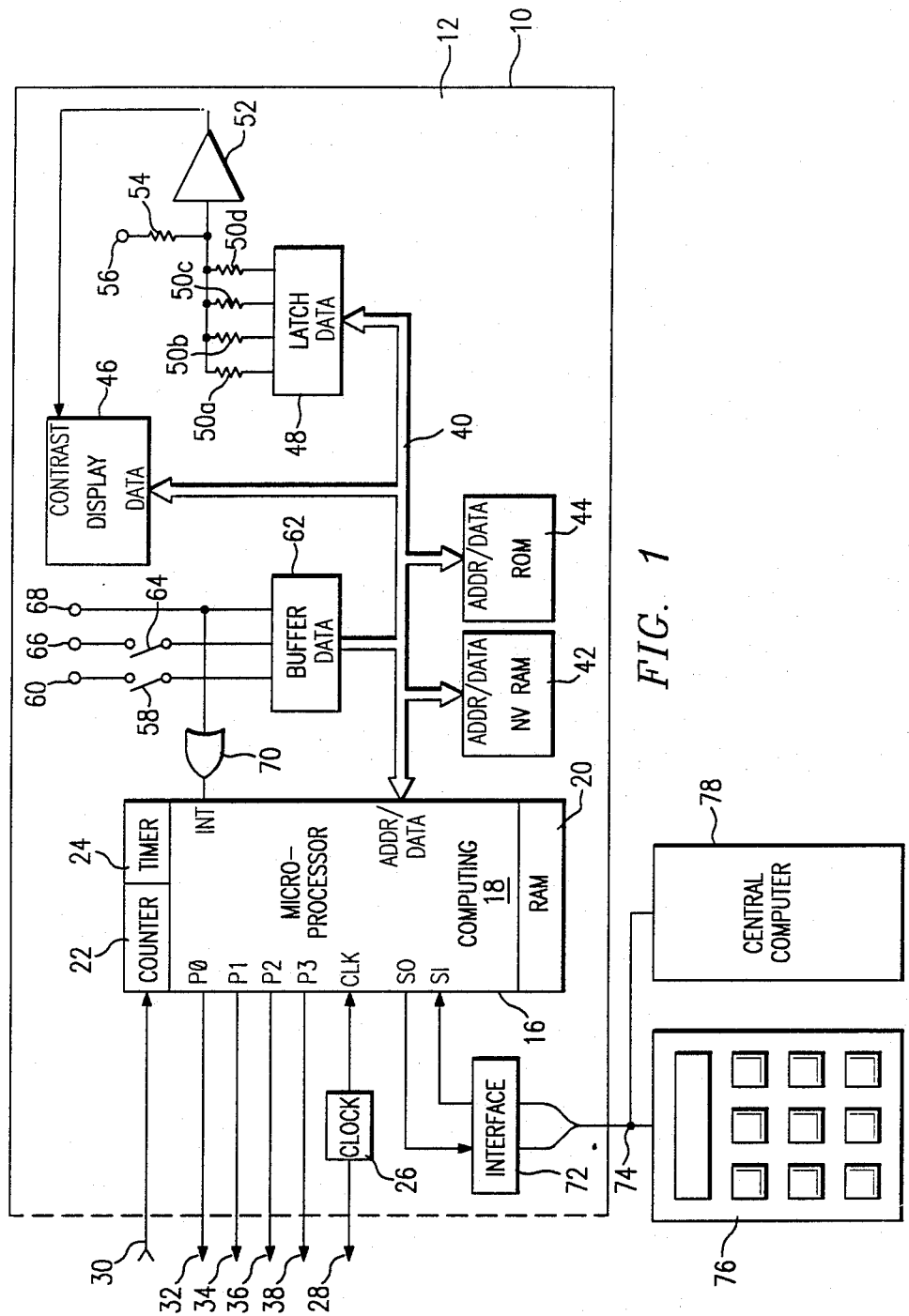
FIG. 1 shows a schematic block diagram of a digital portion of hardware utilized in a preferred embodiment of a platform weighing system constructed according to the present invention.

Counter 22 and timer 24 represent structurally similar programmable circuits which are programmed in the preferred embodiment to operate differently. For example, counter 22 is programmed to begin counting transitions of an external signal at an initial count, which is typically zero, and to continue counting until counter 22 is stopped by computing circuits 18. The count contained within counter 22 is readable at any time by computing circuits 18. On the other hand, timer 24 is programmed to establish predetermined durations for system 10. For example, timer 24 counts a predetermined clock frequency from an initial count to a terminal count. When timer 24 achieves the terminal count, timer 24 stops counting and interrupts microprocessor 16. The initial counting point is programmable to establish the duration. Of course, those skilled in the art will recognize that microprocessor 16 includes substantially conventional circuits for the purpose of the present invention and that other types of computing devices may be adapted for use in the present invention, even though such devices may not include counter 22, timer 24, and RAM 20 within a single integrated circuit.

In addition, digital portion 12 of system 10 includes a clock circuit 26 which has a first output that couples to a clock input of microprocessor 16. This first output provides timing signals for computing circuits 18 of microprocessor 16 and for the operation of timer 24 of microprocessor 16. In addition, clock circuit 26 has a second output which provides a frequency reference signal at a node 28 for a voltage-to-frequency converter, which is discussed below in connection with FIG. 2. An oscillation signal generated by this voltage-to-frequency converter is provided at a node 30 which couples to a count input of counter 22 on microprocessor 16. Moreover, parallel output data ports P0-P3 of microprocessor 16 couple to nodes 32, 34, 36, and 38, respectively, to provide programmable control bits for analog portion 14 of system 10.

Digital portion 12 of system 10 additionally includes a data/address bus 40 which couples to address and data input and output pins of microprocessor 16. Microprocessor 16 communicates with other devices in digital portion 12 of system 10 through bus 40. Consequently, various control circuits and address decoding circuits, which are not shown in FIG. 1, are utilized to decode addresses provided by microprocessor 16 so that only a selected one of these devices is accessed during a memory or input/output operation of microprocessor 16. However, such control in decoding circuits are of a conventional design in the preferred embodiment of the present invention and are not discussed further herein.

One of the devices with which microprocessor 16 communicates over bus 40 is a nonvolatile RAM 42. Nonvolatile RAM 42 retains data stored therein, even though power applied to system 10 may be removed. Although the preferred embodiment utilizes an electrically erasable, programmable, read only memory (EEPROM) for nonvolatile RAM 42, those skilled in the art will recognize that other forms of nonvolatile RAM, such as a volatile RAM with battery backup, may perform the same function.

In addition, microprocessor 16 communicates with a read only memory (ROM) 44 through bus 40. A programmable ROM (PROM) or an erasable PROM (EPROM) may serve as ROM 44. ROM 44 contains computer programs that microprocessor 16 executes, tables that are utilized by the programs which microprocessor 16 executes, and other data which do not change through the operation of system 10.

Microprocessor 16 additionally communicates over bus 40 with a display 46. Display 46 has a data input which couples to bus 40. Display 46 internally latches data written thereto by microprocessor 16. In the preferred embodiment display 46 represents a liquid crystal display (LCD) which displays up to 16 alpha-numeric characters. A predetermined digital code, such as a well-known ASCII code, describes each character to be displayed. After microprocessor 16 writes such codes to display 46 in a predetermined order, the corresponding characters are then observable or perceptible on display 46 by a human user of system 10.

Display 46 additionally incorporates a contrast input. Microprocessor 16 controls a signal applied at this contrast input. Thus, a latch 48 has an input which couples to bus 40 so that microprocessor 16 may write data into latch 48. First, second, third, and fourth output bits of latch 48 couple through resistors 50a, 50b, 50c, and 50d, respectively, to a signal input node of an amplifier circuit 52. In the preferred embodiment, resistor 50b exhibits twice the resistance of resistor 50a, resistor 50c exhibits twice the resistance of resistor 50b and resistor 50d exhibits twice the resistance of resistor 50c. The signal input node of amplifier circuit 52 additionally couples through a resistor 54 to a terminal 56, which supplies one of either a positive, negative, or ground supply voltage. An output of amplifier circuit 52 couples to the contrast input of display 46. Thus, microprocessor 16 writes four bit data codes to latch 48 to program the voltage supplied to the contrast input of display 46.

Digital portion 12 of system 10 additionally includes an interrupt structure. In the preferred embodiment, a manually operable switch 58 has a first node which couples to a terminal 60 and a second node which couples to a first input bit of a buffer 62. Likewise, a second manually operable switch 64 has a first node which couples to a terminal 66 and a second node which couples to a second input bit of buffer 62. Terminals 60 and 66 couple to one of a positive voltage or ground, and the second nodes of switches 58 and 64 additionally couple through resistors (not shown) to the other of a positive voltage or ground. A terminal 68 which provides a signal generated by other portions of system 10, such as low voltage indication circuits (not shown), couples to a third input bit of buffer 62. Each of the above-mentioned inputs to buffer 62 couples to respective inputs of a gate 70 which performs a logical OR function, and an output of gate 70 couples to an interrupt input of microprocessor 16. In addition, buffer 62 has an output which couples to bus 40.

In the preferred embodiment of the present invention, one active interrupt signal is supplied at terminal 68 when battery voltage drops a first predetermined amount, such as from 0.6 to 1.0 volt when a 12 volt battery is being monitored. System 10 causes display 46 to occasionally flash a message stating "Low Battery" when this interrupt signal occurs. In addition, a second interrupt signal is supplied at terminal 68 when battery voltage drops below a second predetermined amount, such as greater than 1.0 volt. In this case, display 46 continually displays a "Low Battery" message. The activation of switch 58 causes system 10 to perform a contrast adjustment function, and the activation of switch 64 causes system 10 to perform a zeroing function. These functions are discussed in more detail below. An active signal is provided at the interrupt input of microprocessor 16 upon the activation of switches 58 or 60 or whenever an active signal is presented on terminal 68. Thus, when microprocessor 16 detects the occurrence of an interrupt signal, microprocessor 16 performs a read operation at buffer 62 to isolate the source of the interrupting signal.

System 10 communicates with devices external to system 10. Microprocessor 16 contains a serial out terminal which couples to an input of a first port of an interface circuit 72. A first port output of interface circuit 72 couples to a serial input of microprocessor 16. Second port input and outputs of interface circuit 72 couple to a serial communication bus 74. Microprocessor 16 performs serial data communications through the serial out and serial in terminals of microprocessor 16. Interface circuit 72 transforms voltage levels between the serial signals received from and applied to microprocessor 16 on one hand and serial communication bus 74 on the other. In the preferred embodiment, the serial data communication occurring on serial data bus 74 conforms to a standard communication protocol, such as the well known RS-232C standard Serial data bus 74 may couple to a hand held terminal 76 which, in the preferred embodiment, contains a display and a plurality of keypads. Hand held terminal 76 is utilized primarily to calibrate system 10. In addition, system 10 may communicate over serial data bus 74 to a central computer 78B. Interface circuit 72 of system 10 may be configured either so that several of systems 10 couple to a single central computer 78 through individual busses 74, or so that several of systems 10 couple through a common drop line bus 74 to central computer 78. Central computer 78 may be utilized to perform the same functions as hand held terminal 76. In addition, central computer 78B may control a plurality of systems 10 in an integrated weighing system which, for example, makes center of gravity calculations when an aircraft is being weighted.

As discussed above, FIG. 2 shows a schematic block diagram of analog portion 14 of system 10. In the preferred embodiment analog portion 14 contains four load cells 80a, 80b, 80c, and 80d. Load cells 80a–80d are pressure type, hydraulic sensing load cells, which are known to those skilled in the art. One example of such a load cell is shown in U.S. Pat. No. 4,583,606 by Narandranath (NMI) Menon and issued to the assignee of the present invention. Such hydraulic sensing load cells are characteristically insensitive to side loads. On the other hand, such hydraulic sensing load cells may have nonlinear outputs. The present invention compensates for this nonlinearity in the manner discussed below. Each of load cells 80a–80d are arranged at corners of a square platform (not shown) so that a load placed anywhere on the platform is transmitted to the four cells. In the preferred embodiment, each of load cells 80a–80d is capable of sensing loads within a 15,000 lb. range. However, the particular load range of load cells 80a–80d is not a critical feature of the present invention.

Figure 2:
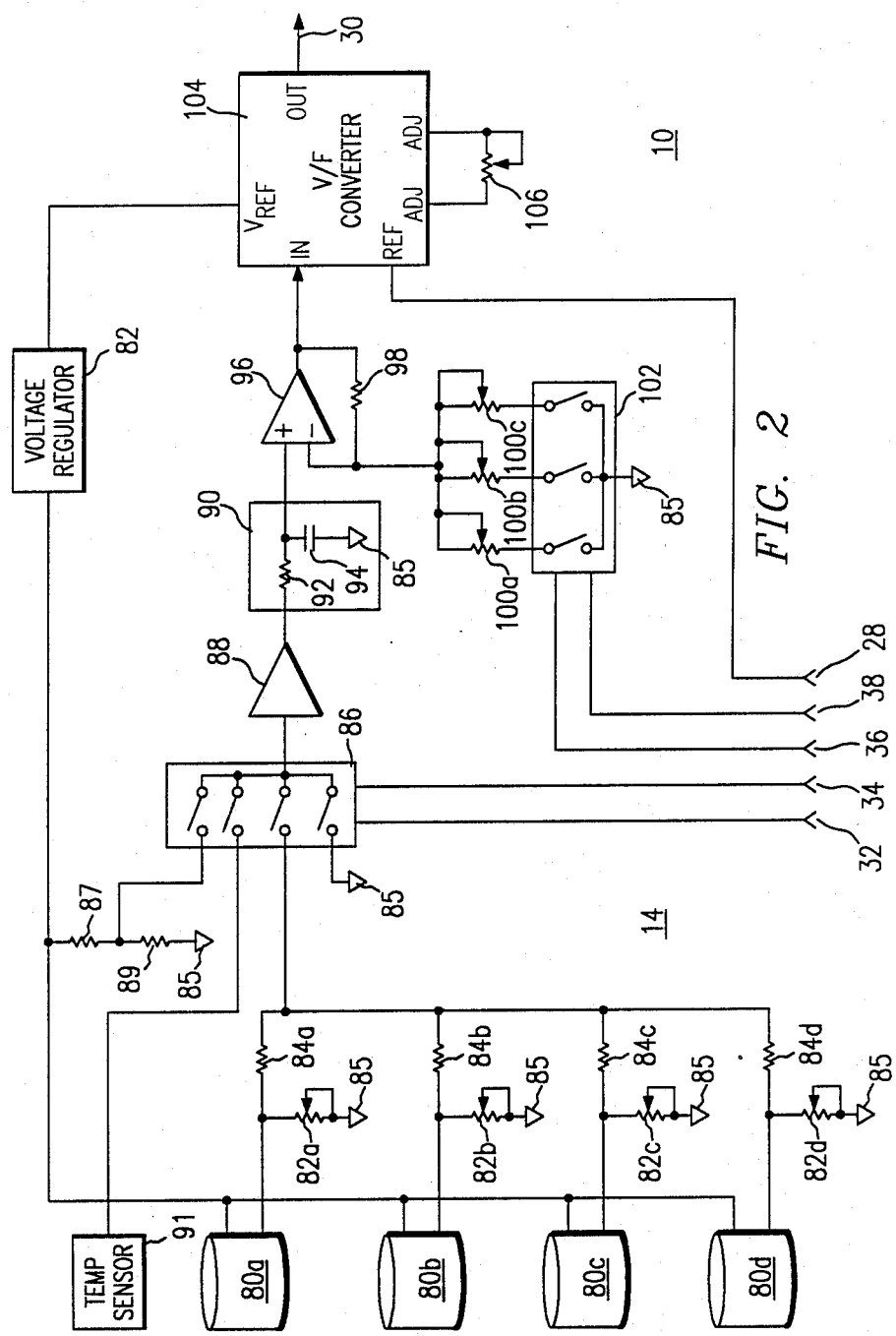
FIG. 2 shows a schematic block diagram of an analog portion of hardware utilized in the preferred embodiment of the present invention.

A voltage regulator 82 provides an excitation signal to each of load cells 80a–80d. In addition, each of load cells 80a–80d provides a load signal output which couples to first nodes of variable resistors 82a–82d and to first nodes of resistors 84a–84d, respectively. Second nodes of resistors 84a–84d couple together. FIG. 2 shows the excitation signal applied to load cells 80a–80d and the load signals supplied by load cells 80a–80d as being single ended signals to simplify the drawings so that the present invention may be easily understood. However, those skilled in the art will recognize that such signals may advantageously be differential signals. Thus, FIG. 2 shows second nodes and tap nodes of variable resistors 82a–82d as being connected to a ground terminal 85. However, with differential signals being output from load cells 80a–8Od such second nodes and tap nodes couple to one node of the differential signal pair.

The second nodes of resistors 84a–84d collectively provide a load signal which couples to a first input of an analog multiplexer 86. The excitation signal at the output of voltage regulator 82 is supplied through a resistor divider network, consisting of a resistor 87 coupled in series with a resistor 89, to a second input of analog multiplexer 86. A semiconductor temperature sensing device 91 is physically located near load cells 80a–80d to sense the temperature experienced thereby. An output of temperature sensor 91 couples to a third input of analog multiplexer 86. Of course, those skilled in the art will recognize that temperature sensor 91 may include biasing and scaling resistors (not shown). A null signal is supplied at a fourth input of analog multiplexer 86. FIG. 2 shows this null signal being supplied by coupling the fourth input of analog multiplexer 86 to ground terminal 85. However, in a differential system a null signal may be supplied by any common mode signal, which need not be at a ground potential.

An analog output of analog multiplexer 86 couples to an input of an amplifier 88. In the preferred embodiment, amplifier 88 represents an instrumentation amplifier which is configured to maximize a common mode rejection ratio parameter. An output of amplifier 88 couples to an input of a low pass filter 90. Low pass filter 90 includes a resistor 92 which has a first node that couples to the output of amplifier 88 and a second node which couples to a first node of a capacitor 94. A second node of capacitor 94 couples to ground terminal 85. In the preferred embodiment, resistor 92 and capacitor 94 are chosen so that filter 90 exhibits a frequency response having a single pole at approximately 5 Hz.

The second node of resistor 92 provides the output from filter 90. The output from filter 90 couples to a positive input of an operational amplifier (op amp)

An output of op amp 96 couples through a resistor 98 to a negative input of op amp Additionally, the negative input of op amp 96 couples to first nodes of variable resistors 100a, 100b and 100c. Tap nodes of resistors 100a–100c also couple to the negative input of op amp 96. Second nodes of resistors 100a–100c couple to first, second, and third inputs, respectively, of an analog multiplexer 102. An output of analog multiplexer 102 couples to ground terminal 85.

The output of op amp 96 additionally couples to a signal input of voltage-to-frequency converter 104. Converter 104 includes first and second adjustment terminals which couple to first and second nodes of a variable resistor 106. Additionally, a tap node of variable resistor 106 couples to the first adjustment node of converter 104. Moreover, converter 104 includes a voltage reference output which couples to an input of voltage regulator 82 to provide a reference voltage for regulator 82.

An output of voltage-to-frequency converter 104 couples to node 30 and provides the oscillation signal which was discussed above in connection with FIG. 1. Moreover, the frequency reference signal discussed above in connection with FIG. 1 is supplied at node 28 to a reference frequency input of converter 104. Nodes 32 and 34, which couple to parallel output bits of microprocessor 16 in FIG. 1, couple to control inputs of analog multiplexer 86. Likewise, nodes 36 and 38, which couple to parallel output bits of microprocessor 16 in FIG. 1, couple to control inputs of analog multiplexer 102.

Accordingly, a load may be applied to the platform under which load cells 80a-80d reside. Load cells 80a-80d then output load signals proportional to the load. These load signals are resistively summed through resistors 84a-84d and applied to the first input of analog multiplexer 86. Under the control of microprocessor 16, analog multiplexer 86 may select this summed load signal for application to amplifier 88. The amplified load signal from amplifier 88 is then filtered in filter 90 and applied to op amp 96. Op amp 96, together with resistor 98, resistors 100a-100c, and analog multiplexer 102, form a non-inverting amplifier which exhibits a variable gain. This variable gain is controlled by microprocessor 16 through the application of appropriate control bits at nodes 36 and 38. Consequently, a load signal applied to amplifier 96 is amplified in a accordance with this programmable gain and applied to voltage-to-frequency converter 104. Converter 104 generates a oscillation signal in which the frequency of oscillation is proportional to the load.

Referring to FIG. 1, counter 22 of microprocessor 16 counts the oscillations of this oscillation signal for a predetermined duration. The resulting load count at the end of this predetermined duration is proportional to the load applied at load cells 80a-80d. Computing circuits 18 within microprocessor 16 obtain this load count and convert it into a weight code which may be output to display 46 in such a form that a user of system 10 perceives measured weight.

Referring back to FIG. 2, analog portion 14 of system 10 permits many adjustments in the calibration of the hardware of system 10. For example, in a first adjustment, a known load is applied to each of load cells 80a-80d individually while the outputs from load cells 80a-80d are monitored. Load signals output at the three of load cells 80a-80d which provide the greatest amplitude output signals are adjusted at the corresponding three of variable resistors 82a-82d until each of load cells 80a-80d produce identical outputs with identical loads applied thereto. Next, appropriate control signals may be applied at nodes 32 and 34 to select the null signal for application to the input of amplifier 88. An offset adjustment (not shown) at amplifier 88 may be performed to compensate for offsets occurring anywhere in the system between load cells 80a-80d and voltage-to-frequency converter 104.

Next, with no load applied at load cells 80a-80d, variable resistor 106 may be adjusted so that voltage-to-frequency converter 104 generates a predetermined output frequency. In the preferred embodiment, converter 104 represents a VFC 100 device, which is manufactured by the Burr-Brown Corporation. Consequently, in the preferred embodiment converter 104 outputs an approximately 15K Hz oscillation signal when no load is applied at load cells 80a-80d. This output frequency is typical of many conventional voltage-to-frequency converters, each of which could be adapted by those skilled in the art for use in the present invention.

In calibrating the hardware for system 10, Control bits applied at nodes 32 and 34 may change to cause analog multiplexer 86 to select the excitation signal for application to the input of amplifier 88. In the preferred embodiment, the voltage divider which includes resistors 87 and 89 is configured so that the excitation signal applied at the second input of analog multiplexer 86 is a predetermined fraction of a full scale load signal that may be applied at the first input of analog multiplexer 86 under nominal conditions. This fractional excitation voltage may be used to calibrate gain settings of op amp 96. By selectively switching one of resistors 100a-100c into the circuit surrounding op amp 96, predetermined frequencies should result at the output of voltage-to-frequency converter 104. If these predetermined frequencies do not occur, then resistors 100a-100c may be adjusted until such frequencies do occur.

Referring back to FIG. 1, microprocessor 16 executes programs which are stored in ROM 44 to accomplish the various functions performed by system 10. The flow charts shown in FIGS. 3-8 illustrate various ones of these programs in a simplified form. Generally speaking, these programs may be viewed as being partitioned so that system 10 operates in one of four different modes at any given time.

One of these four modes is a reset mode which is executed whenever power is initially applied to system 10. In this reset mode, microprocessor 16 executes a program which initializes variables, clears display 36, and performs some self-testing routines. In addition, during this self testing mode, microprocessor 16 determines whether or not a device, such as terminal 76 or central computer 78, is coupled to serial bus 74 by transmitting a predetermined data pattern on serial bus 74 and waiting a predetermined amount of time for a reply. Otherwise, the tasks performed by microprocessor 16 in the reset mode are relatively conventional in microprocessor based designs, and are not discussed further herein.

If microprocessor 16 determines that a terminal 76 or central computer 78 is attached, system 10 operates in a second mode after completion of the reset mode. The second mode is a primary calibration mode. The primary calibration mode is discussed below in more detail in connection with FIG. 8.

The third and fourth modes in which system 10 operates are a foreground mode 200 and an interrupt mode 400. Foreground mode 200 is illustrated in FIGS. 3-6. Foreground mode 200 includes the programs which microprocessor 16 executes when it has no cause to execute other programs. For example, after the reset mode has been executed, displays and variables require no further initialization. If microprocessor 16 detects that no terminal 76 or central computer 78 is attached to serial bus 74, and if microprocessor 16 detects no activation of an interrupt, then microprocessor 16 executes the programs of foreground mode 200.

Consequently, foreground mode 200 may be considered the normal mode of operation or the mode which is most directly involved with measuring the weight of a load applied to load cells 80a-80d (see FIG. 2). A task 210 within foreground mode 200 determines whether system 10 requires performance of an auto-calibration process. This determination is made by examining a "weighings counter". This weighings counter is a software counter which is incremented after each weighing. The preferred embodiment performs an auto-calibration process once for every 256 weighings, which represents one auto-calibration process every five to seven minutes.

The output from conventional load cells 80a-80d (see FIG. 2) varies as a function of temperature. In other words, a constant load applied to load cells 80a-80d at different temperatures produces a load signal output from load cells 80a-80d that varies. Moreover, voltage regulator 82 (see FIG. 2) represents a linear type of voltage regulator. Thus, the excitation signal output from regulator 82 may experience some degradation in regulation over temperature extremes or other environmental operating conditions. Any change in the excitation voltage supplied to load cells 80a-80d causes a change in the load count detected by counter 22 (see FIG. 1). Consequently, the temperature and this excitation signal are monitored so that appropriate compensation may take place. An auto-calibration process takes load count readings from the temperature, excitation, and null inputs to analog multiplexer 86 (see FIG. 2) so that a calculate weight routine, discussed below, may compensate for drifts in the electrical circuits of analog portion 14 of system 10. Such drifts are typically due to temperature changes, but can also be caused by aging of components or other factors.

Assuming that task 210 decides that an auto-calibration process is not needed, which is the most frequent decision in the preferred embodiment, process control proceeds to a collect load count routine 220. Collect load count routine 220 is discussed in more detail in FIG. 4. Upon entry of program control to collect load count routine 220, a task 222 clears and enables counter 22 of microprocessor 16 (see FIG. 1). Thus, after task 222, counter 22 begins counting oscillations or cycles of the oscillation signal output from voltage-to-frequency converter 104 (see FIG. 2).

Next, a start timer task 224 establishes a predetermined time period using timer 24 of microprocessor 16 (see FIG. 1). Timer 24 causes an interrupt to be generated upon the expiration of a programmed duration.

After task 224, a task 226 simply causes program control to wait a predetermined amount of time. Wait task 226 operates in conjunction with the interrupt mode, as discussed below in conjunction with FIG. 7. The amount of time which program control waits before proceeding to the next task represents the amount of time that counter 22 (see FIG. 1) spends counting oscillations of the oscillation signal.

The preferred embodiment of the present invention operates in environments in which one or more of 50 Hz, 60 Hz, and 400 Hz noise signals are particularly pervasive. By counting, or waiting in task 226, for an amount of time which is an interval multiple of the periods for these particularly pervasive noise signals, only complete cycles of these noise signals influence the analog amplitude signals in analog portion 14 of system 10 (see FIG. 2). Since a complete cycle contains an equivalent amount of positive and negative signal level, the amplitude effects from both the positive and negative portions of such 50 Hz, 60 Hz, and 400 Hz signals tend to cancel. The period for a 50 Hz cycle is 20 msec, the period for a 60 Hz signal is 16.6667 msec, and the period for a 400 Hz signal is 2.5 msec. The lowest duration which is an integral multiple of each of these periods is 100 msec, in which 5, 6, and 40 complete cycles of 50 Hz, 60 Hz, and 400 Hz signals, respectively, occur. Consequently, wait task 226 waits a minimum of 100 msec.

However, the preferred embodiment of the present invention waits 400 msec in wait task 226. The longer the wait in task 226, the less influence higher frequency noise has on the load count obtained from counter 22 (see FIG. 1) at the end of that period. Higher frequency noise is also present in the analog signals in analog portion 14 of system 10 due to the digital circuitry contained in digital portion 12 of system 10. Thus, this longer period helps minimize noise caused by digital circuitry and other sources.

Moreover, the longer period increases the resolution obtainable by counter 22 (see FIG. 1). In the preferred embodiment, a full scale signal may be converted by voltage-to-frequency converter 104 (see FIG. 2) into an oscillation signal having a frequency of approximately 140K Hz. When a signal having such a frequency is integrated for approximately 400 msec., slightly less than 60,000 cycles or counts result. Consequently, a single least significant bit change in a full scale count represent a smaller portion of the total count than would occur if a shorter duration were used. A 400 msec. duration for the wait in task 226 tends to maximize the precision attainable with a 16 bit counter.

After task 226, a task 228 gets or reads a resulting load count from counter 22 (see FIG. 1), and a task 230 increments the weighings counter, discussed above in connection with task 210, to show that an additional weighing has been performed. After task 230, program control exits collect load count routine 220. In summary, routine 220 obtains a monitored load count which is proportional to the analog signal applied at the input of amplifier 88 (see FIG. 2).

As discussed above, task 210 decides whether an auto-calibration process is needed. Collect load count routine 220 is performed when this auto-calibration process is not needed. However, when task 210 determines that an auto-calibration process is needed, program control transfers to an auto-calibration routine 240. Auto-calibration routine 240 is described in more detail in FIG. 5.

Figure 5:
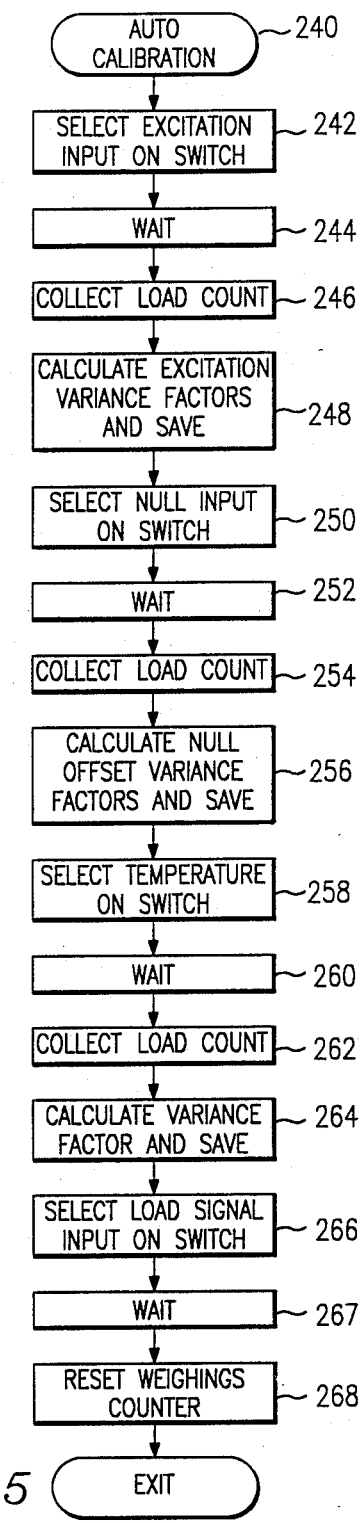
FIG. 5 shows a simplified flow chart of an Auto-Calibration routine shown in FIG. 3.

Referring to FIG. 5, a task 242 within auto-calibration routine 240 selects the excitation input of analog multiplexer 86 (see FIG. 2) for application to the input of amplifier 88. This selection occurs by causing microprocessor 16 to output the appropriate control bits at nodes 32 and 34. Next, a task 244 simply waits a predetermined amount of time. During this waiting task, an appropriate message may be displayed at display 46 (see FIG. 1).

The selection which occurs at task 242 causes a step input to be applied at amplifier 88 and filter 99 (see FIG. 2). A step input to any single pole filter, such as filter 90, requires approximately 11 time constants before the output value from the filter is within approximately 0.9998% of its ultimate output value. Consequently, task 244 in the preferred embodiment of the present invention waits for a period of time approximately equivalent to 11 time constants of filter 90, which represents a wait of several seconds. After wait task 244, a collect load count routine 246 is performed to obtain a monitored excitation load count. Routine 246 is substantially the same as routine 220, which is discussed above in connection with FIG. 4. Thus, routine 246 generates a monitored exitation count which is proportional to the excitation signal routed to amplifier 88 (see FIG. 2). Using the monitored excitation load count from routine 246, a task 248 calculates excitation variance factors and saves these factors for future use.

During the primary calibration procedure, discussed below in connection with FIG. 8, predetermined weights are applied to load cells 80a–80d (see FIG. 2), and the monitored load counts which result from the application of such weights are obtained. These load counts are saved as calibration load counts in a table, discussed below. The validity of a particular calibration load count resulting from the application of a predetermined weight depends upon excitation voltage. If excitation for a present measurement has changed from the excitation which occurred during primary calibration, then current load counts must be compensated to account for this change so that a highly accurate weight measurement results. Task 248 essentially performs a ratio operation wherein the monitored excitation count is divided by the calibration excitation count. The result of this division is the excitation variance factor, which task 248 saves for future use.

After task 248, a task 250 selects the null input on analog multiplexer for application to amplifier 88 (see FIG. 2). Then, a wait task 252 waits for a period of time approximately equivalent to 11 time constants of filter 90. A routine 254 is performed to collect a monitored null count from counter 22 (see FIG. 1). Task 250, task 252, and routine 254 are similar to task 242, task 244, and routine 246, respectively, as discussed above except that task 254 generates the monitored null count. A task 256 utilizes this monitored null count to calculate a null offset variance factor. The monitored null count may differ from a calibrated null count which was obtained during primary calibration. Any variance in null offset from that present during primary calibration reduces accuracy of load counts obtained from load signals output from load cells 80a–80d (see FIG. 2). Consequently, task 256 calculates any change in null offset by performing a subtraction operation. The results of this subtraction operation represent the null offset variance factor. Task 256 additionally saves this null offset variance factor for future use in compensating such potential inaccuracy.

After task 256, a task 258 selects the temperature input on analog multiplexer 86 for application to amplifier 88 (see FIG. 2). Then, a wait task 260 waits for a period of time approximately equivalent to 11 time constants of filter 90. Next, a routine 262 is performed to collect a monitored temperature count from counter 22 (see FIG. 1). Tasks 258, 260, and 262 are similar to tasks 242, 244, and 246, respectively, as discussed above, except that tasks 262 generates a monitored temperature count.

A task 264 utilizes this monitored temperature count to calculate a temperature variance factor. As discussed above, the output signal from load cells 80a–80d varies as a function of temperature. Task 264 is programmed to know the general relationship between temperature and the output from load cells 80a–80d. A general relationship applicable to all load cells may be included in the programming of task 264. Alternatively, specific calibration points may be programmed either at the time of manufacture or during primary calibration (discussed below), and an interpolation process may be used to obtain a specific output factor for sensed temperature. Such an interpolation process may be similar to an interpolation process which is discussed below in connection with FIG. 6. Consequently, task 264 calculates a temperature variance factor which characterizes load cells 80a–80d and saves this temperature variance factor for future us in compensating potential inaccuracies caused by operating load cells 80a–80d at extreme temperatures.

After task 264, a task 266 again changes the selection control on analog multiplexer 86. This time, analog multiplexer 86 is switched so that it selects the load signal output from load cells 80a–80d for input to amplifier 88 (see FIG. 2). After task 266, a task 267 again waits for a period of time approximately equivalent to 11 time constants of filter 90. After task 267, a task 268 resets the weighings counter to restart the auto-calibration cycle, in which the preferred embodiment collects 256 measurements of the output from load cells 80a–80d prior to performing a single auto-calibration process. After task 268, program control then exits routine 240.

Referring back to FIG. 3, after completion of auto-calibration routine 240, program control proceeds to collect load count routine 220. As discussed above, collect load count routine 220 generates a load count which is responsive to a weight applied at load cells 80a–80d. After routine 220, a task 270 tests whether a correct range factor is being used to obtain this monitored load count.

Figure 3:
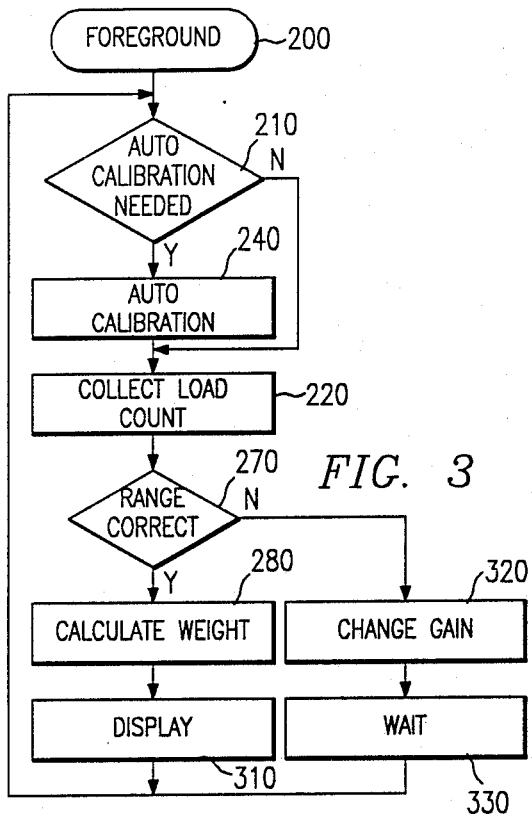
FIG. 3 shows a simplified flow chart of tasks performed by a microprocessor in the preferred embodiment of the present invention when the microprocessor executes a program in a foreground mode.
Figure 4:
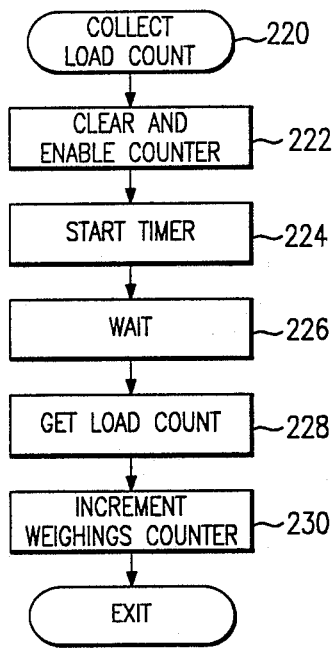
FIG. 4 shows a simplified flow chart of a Collect Load Count routine shown in FIG. 3.

The preferred embodiment of the present invention implements an auto-ranging function. For example, if loads in the range of zero to 25,000 lbs. are applied to system 10, then such loads may be displayed with a precision of ±1 lb. Loads in the range of 25,000 45,000 lbs. may be displayed with a precision of ±2 lbs. Additionally, loads in the range of 45,000–60,000 lbs. may be displayed with a precision of ±5 lbs. An appropriate one of these ranges is selected by controlling the gain of op amp 96 (see FIG. 2) through the application of proper control bits at nodes 36 and 38. Task 270 examines the currently used range, which may be stored as a variable in memory. Next, task 270 compares the monitored load count obtained from routine 220 with predetermined limits for this current range. If such a comparison shows that the monitored load count is within such predetermined limits, then this monitored load count may be utilized to calculate weight, and program control transfers to a calculate weight routine 280, as shown in FIG. 3.

Calculate weight routine 280 is described in more detail in FIG. 6. Referring to FIG. 6, calculate weight routine 280 multiplies the monitored load count from routine 220 (see FIG. 3) by the excitation variance factor in a task 282. The excitation variance factor was discussed above in connection with task 248 in FIG. 5. Thus, a monitored load count output by task 282 is compensated for any variance in excitation occurring between primary calibration and the present load measurement. Those skilled in the art will recognize that task 282 may alternatively perform the ratioing, discussed above in connection with task 248 of FIG. 5, and the multiplying, contemplated in task 282 of FIG. 6, all in task 282 of FIG. 6. However, this technique may tend to unacceptably slow the speed at which microprocessor 16 executes calculate weight routine 280.

After task 282, a task 284 multiplies the results from task 282 by the temperature variance factor, discussed above in connection with task 264 of FIG. 5. Thus, the output from task 284 represents a monitored load count which has additionally been compensated to account for load cell inaccuracy caused by operating load cells 80a-80d at a particular temperature.

After task 284, a task 286 adds or subtracts the null offset variance which was calculated in step 256, discussed above in connection with FIG. 5. Thus, the monitored load count output from task 286 has been compensated for both excitation and null variances between the present load measurement and primary calibration and for the temperature performance load cells 80a-80d.

Next, tasks 288-296 together perform a linear interpolation between calibration points to obtain an accurate weight Value. This linear interpolation compensates the output provided by load cells 80a-80d (see FIG. 2) for non-linear outputs. Task 288 finds upper and lower calibration weights which bound the monitored load count produced by task 286. Task 288 may use one of several calibration look up tables to obtain these boundaries. The particular calibration look up table depends upon the current range, discussed above in connection with task 270 of FIG. 3, with which the present monitored load count has been obtained.

An example of a portion of such a look up table is shown below in TABLE 1 for the purpose of teaching the present invention. Of course, those skilled in the art will understand that an actual calibration table need not have similar values or relationships between values.

TABLE 1

| Pounds | Calibrated Load Count | Slope |
|---|---|---|
| 40k | 42k | 0.83333 |
| 45k | 48k | 1.0000 |
| 50k | 53k | 1.2500 |
| 55k | 57k | 1.6667 |
| 60k | 60k | |

TABLE 1 shows an example of a calibration look up table which may be utilized in connection with a maximum range that system 10 uses to display weights from 45,000 to 60,000 lbs. with a precision of ±5 lbs. The "Pounds" column of TABLE 1 represents an index to the table, and the "Calibrated Load Count" column provides entries in the table.

Task 288 utilizes the monitored load count obtained from task 286 to obtain upper and lower calibration weight boundaries. For example, if a monitored load count of 55,000 counts were generated by task 286, then any of various sorting routines known to those skilled in the art could be used to determine that the table entry having a calibrated load count of 53,000 and an associated calibration weight of 50,000 lbs. represents a lower boundary to the monitored load count. Calibration load counts are arranged in ascending order so that the organization of the table guarantees that the next table entry, in which a calibration weight of 55,000 lbs. is associated with a calibration load count of 57,000, is the upper boundary.

After task 288 finds the upper and lower calibration weight boundaries to the monitored load count from task 286, a task 290 obtains the slope between these boundaries. The slope in task 290 represents a change in pounds between two adjacent calibration weights of the look up table divided by a change in calibration load counts between the same two adjacent entries. In other words, the slope represents the pounds per count which results from weighing loads within the range of weight suggested by such two adjacent calibration weights, assuming a linear rate of change. Task 290 may obtain this slope by performing the required subtraction and division operations using the boundary calibration weights and associated calibration load counts of the look up table as found by task 288. Alternatively, these calculations may be performed during primary calibration and stored at corresponding positions in the look up table, as shown in the "Slope" column of TABLE 1 above. Using the example discussed above where task 288 generates a monitored load count of 55,000, task 290 would use the example values shown above in TABLE 1, to obtain a slope of 1.25 between a calibration weight of 50,000 lbs. and a calibration weight of 55,000 lbs.

After task 290, a task 292 subtracts the lower boundary calibration load count from the monitored load count. For the example discussed above, 53,000, which represents the lower boundary calibration load count, is subtracted from 55,000, which represents the monitored load count, to produce a result of 2,000 counts. A task 294 multiplies the difference generated in task 292 by the slope obtained in task 290. Thus, in the example discussed above, task 294 multiplies a slope of 1.25 pounds per count by a difference of 2,000 counts to produce the result of 2,500 pounds.

A task 296 adds the lower boundary calibration weight to the weight which was generated by task 294. In the example, the lower boundary calibration weight is 50,000 pounds. This 50,000 pounds is added to the 2,500 pound result generated in task 294 to produce a result of 2,500 pounds.

Next, a task 298 examines the weight generated in task 296 to determine whether the load is in motion. Motion is detected by comparing a currently obtained weight with a weight measured approximately one second earlier. Consequently, task 298 subtracts a previously obtained weight from the weight which was just obtained in the most recent execution of routine 220 (see FIG. 4). If this difference is within a predetermine limit, such as ±2 pounds, then task 298 concludes that the load is not in motion. In this case, program control proceeds to a task 300. Task 300 subtracts a weight that corresponds to a tare weight from the weight generated by task 296. The tare weight load count represents the weight of an empty container or other object which may rest on load cells 80a-80d (see FIG. 2) and which is not part of the object being weighed. However, for the purposes of task 300 the tare weight is simply a variable which is set in accordance with the procedure discussed below in connection with FIG. 7.

After task 300, a task 302 tests the digital value provided by task 300 to see whether or not its absolute magnitude is less than a predetermined value. In the preferred embodiment, this predetermined value is around ten pounds. Task 302 provides an automatic zeroing function for system 10. System 10 assumes that load cells 80a-80d are not intended to measure weights less than those that correspond to the weight tested in task 302. Consequently, any measurements less than this predetermined weight are assumed to be caused by drifts in the various components of system 10. Such drifting is particularly common immediately after system 10 has been activated until an established temperature has been achieved.

If task 302 detects that the tested value is less than the predetermined weight, then a task 304 saves the value as a new tare value for use in future calculations. Upon completion of task 304, or if task 302 detects a weight which is greater than the predetermined weight, or if task 298 detects that a load is in motion, program control proceeds to a task 306. Task 306 subtracts the tare value from the load count. This tare value may have been previously adjusted in task 304 to provide the automatic zeroing function, as discussed above.

Consequently, the value output from task 306 corresponds to a weight which has been compensated for automatic zero, tare, temperature, excitation and null variances, and nonlinearities of load cells. After task 306, a task 308 simply saves this weight value, and program control then exits calculate weight routine 280.

Referring back to FIG. 3, after a weight has been calculated by routine 280, foreground mode 200 next performs a display task 310. Display task 310 converts the weight value obtained from collect weight routine 280 into a proper weight code, such as a sequence of ASCII codes, for application to display 46 (see FIG. 1). In addition, display task 310 formats this weight code to properly position the digits and to add unit characters, such as lbs. or Kgs, or range information to the sequence of codes. Task 310 next writes the formatted weight code to display 46. The writing of the weight code to display 46 causes a humanly perceptible indication of the weight experienced by load cells 80a-80d (see FIG. 2) to occur at display 46. Upon completion of task 310, program control remains in foreground mode 200 by looping back to task 210, discussed above.

Referring back to task 270 in foreground mode 200, a test was performed to determine whether or not a correct range was being utilized. Calculate weight routine 280 and display routine 310 are performed only when the correct range is being utilized. However, when the correct range is not being utilized, program control transfers to a change gain task 320. Task 320 causes microprocessor 16 (see FIG. 1) to change the control bits applied at nodes 36 and 38 so that the gain at amplifier 96 (see FIG. 2) changes in accordance with whether an increase or decrease in gain is required.

After task 320, a task 330 waits before transferring program control back to task 210. The wait contemplated at task 330 is merely a few msec., which is sufficiently long to compensate for any unstabilizing effects which may result from instantly changing the gain of amplifier 96.

Figure 7:
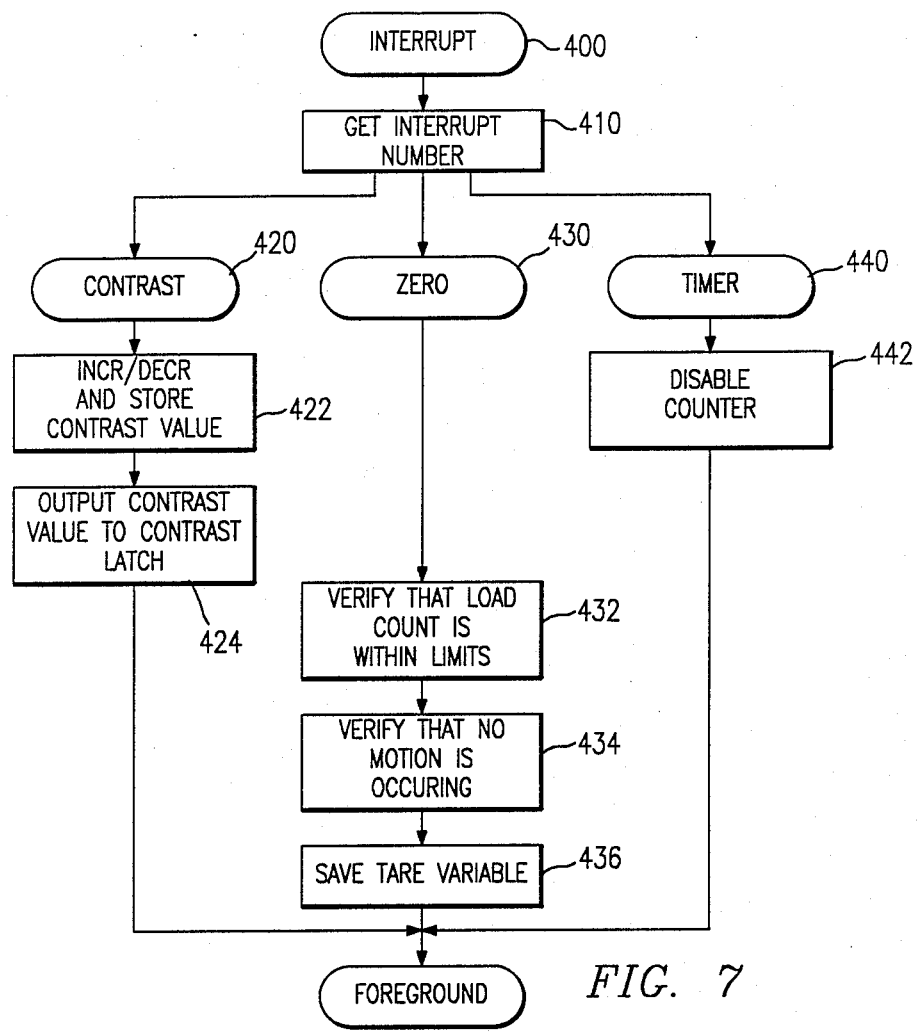
FIG. 7 shows a simplified flow chart of tasks performed by the microprocessor in the preferred embodiment of the present invention when the microprocessor executes a program in an Interrupt mode.

As shown in FIG. 3, program control remains in the loop which is defined by foreground mode 200 and discussed above so long as nothing happens to cause program control to transfer away from this loop. However, the occurrence of an interrupt may cause program control to transfer away from foreground mode 200 and operate in an interrupt mode 400, as shown in FIG. 7. Once program controls enters interrupt mode 400, a task 410 reads data from buffer 62 (see FIG. 1) to determine which one of the various interrupts has occurred.

The activation of switch 58 (see FIG. 1) causes system 10 to execute a contrast adjust function 420. Contrast adjust function 420 is entered by program control from task 410. A task 422 within contrast function 420 obtains a contrast variable from memory. This contrast variable equals a contrast value previously written into latch 48 (see FIG. 1). Next, task 422 either increments or decrements this contrast value and restores the upgraded contrast value back into memory. If task 422 has not been previously performed within a predetermined period of time, then task 422 increments this contrast value. However, if task 422 has been previously performed within this predetermined period of time, then this contrast value is decremented. After task 422, a task 424 outputs the contrast value incremented or decremented by task 422 to latch 48, and the contrast of display 46 is adjusted as discussed above in connection with FIG. 1. After task 424, program control exits contrast function 420 and returns to foreground mode 200.

Thus, a user of system 10 may depress contrast adjust switch 58 to cause display 46 to become darker. However, if a user wishes display 46 to become lighter, the user releases contrast adjust switch 58 and re-depresses contrast adjust switch 58 within a short period of time. So long as a user continually depresses contrast adjust switch 58, subsequent interrupts cause program control to return to contrast function 420. Of course, contrast function 420 may additionally check to determine when maximum and minimum contrast values have been reached and reverse the incrementing and decrementing processes when these values are reached.

Referring back to task 410, upon the occurrence of a tare identification signal caused by the activation of switch 64 (see FIG. 1), program control transfers to a zero function 430. Zero function 430 sets the tare value discussed above in connection with tasks 300 and 306 of FIG. 6. Upon entry of program control to zero function 430, a task 432 obtains a most recent weight and verifies that this weight is within tare limits. The preferred embodiment establishes tare limits at around ±3,000 pounds. Thus, an error message may be displayed if the user of system 10 attempts to tare-out a weight greater than ±3,000 pounds. In this situation, program control may exit zero function 430 without modifying a tare value (not shown). After task 432, a task 434 verifies that the load is not in motion. Thus, task 434 is similar to task 298, discussed above in connection with FIG. 6. Of course, if task 434 detects motion, an appropriate error message may be displayed, and program control may exit routine 430 without adjusting tare values (not shown). Next, a task 436 saves the verified tare value from task 432 in memory. After completion of task 436, program control exits zero function 430 and returns to foreground mode 200.

Another one of the interrupts which task 410 may recognize comes from timer 24 (see FIG. 1). When this happens, program control is transferred to timer function 440. In a task 442, timer function 440 simply disables counter 22 and returns program control to foreground mode 200. In the preferred embodiment of the present invention program control may be in one of the many wait tasks discussed above prior to the occurrence of a timer interrupt. After task 442, program control may immediately proceed to a subsequent task from the wait task which was being performed when the interrupt occurred. Alternatively, program control may exit task 442 and simply remain in the wait task which was being performed when the interrupt occurred. In such situations, many interrupts may be counted by a software counter incremented in task 442 to control the exit of program control from such wait tasks.

As discussed above, a primary calibration process is utilized to program calibration load counts and calibration weights in calibration look up tables that are utilized by calculate weight routine 280, shown in FIG. 6. Furthermore, as discussed above system 10 may operate in a calibrate mode when system 10 detects that a terminal 76 or central computer 78 (see FIG. 1) is attached to serial bus 74 during execution of a reset mode. When this determination has been made, program control enters calibrate mode 500, which is shown in simplified form in a flow chart in FIG. 8. When program control enters calibrate mode 500, a task 510 prompts the user of system 10 to apply the next calibration weight. This prompting may occur at the display of terminal 76 or at central computer 78 (see FIG. 1).

After task 510, a task 520 tests an input provided by the user to determine whether a calibration weight has been applied as requested by task 510 or whether program control should exit calibrate mode 500. When task 520 determines that the user has indicated that the next calibration weight has been applied, program control continues to a routine 530.

Collect load count routine 530 is substantially identical to routine 220, discussed above in connection with FIG. 4. Thus, task 530 obtains a load count which corresponds to the calibration weight applied at load cells 80a-80d (see FIG. 2). This load count is then supplied to a task 540 which may test to see if the obtained load count is a reasonable value for the calibration weight which the user should have applied. If so, task 540 saves this load count in the calibration look up table associated with the appropriate calibration weight as a calibration load count.

Next, auto calibration routine 550, which is similar to routine 240, discussed above in connection with FIG. 5, is performed to obtain a calibration excitation count and a calibration null count. After the execution of routine 550, a task 560 saves the calibration excitation and calibration null counts associated with the appropriate calibration look up table. After completion of task 560, program control returns to task 510, discussed above.

The preferred embodiment of the present invention contemplates the use of a single calibration excitation count and a single calibration null count for an entire calibration table. Thus, the preferred embodiment contemplates that excitation and null values should not change during the primary calibration process. Task 560 may additionally verify that excitation and null counts have not changed throughout the primary calibration process. If such counts have changed, then, task 510 may prompt the user to reapply the affected calibration weights. Alternatively, calibration load counts previously obtained with different excitation and null counts may be mathematically compensated utilizing tasks similar to those discussed above in connection with tasks 282 and 286, described in FIG. 6.

In addition, primary calibration mode 500 may request a user to input data describing the temperature performance of load cells 80a-80d (see FIG. 2), as discussed above in connection with task 264 of FIG. 5. Such data may be obtained from data sheets which describe the operation of load cells 80a-80d. In the preferred embodiment, program control remains in calibrate mode 500 until a user causes program control to exit at task 520. When program control exits calibrate mode 500, it proceeds to foreground mode 200. Moreover, once program control has exited calibrate mode 500, it may not reenter calibrate mode 500 without going through the reset mode first.

In summary, the present invention combines many factors to provide an extremely accurate weight measurement. For example, analog section 14 of system 10 includes filter 90 and voltage-to-frequency converter 104 to reduce noise. The voltage-to-frequency conversion diminishes the influence of noise over, for example, an analog-to-digital conversion. Moreover, the software utilized in the present invention forces counter 22 (see FIG. 1) to integrate the oscillation signal provided by voltage-to-frequency converter 104 over a time period which is an integral multiple of particularly pervasive noise signals. Still further, many compensating calculations and calibration calculations are performed to ensure that an accurate weight measurement results. For example, the primary calibration process collects at least ten calibration points in the preferred embodiment of the present invention. These ten calibration points compensate for nonlinearities in output of hydraulic load cells 80a-80d. Moreover, auto calibration routines continually monitor temperature, excitation, and nulls so that necessary compensations may occur. Still further, the present invention provides an auto ranging function for still greater precision, an automatic zeroing function, and the ability to zero out a tare weight.

The foregoing description discusses the preferred embodiment of the present invention, which may be changed or modified without departing from the scope of the present invention. Many of the particular hardware and software features discussed herein may be modified without altering the basic scope of the present invention. For example, the nonvolatile RAM discussed above in connection with FIG. 1 may couple to parallel ports of the microprocessor instead of the address/data bus. Alternatively, the order of tasks in the many routines discussed in FIGS. 3–8 is generally not critical in the present invention and may be modified without altering the basic scope of the present invention. Still further, individual switches may be utilized for analog multiplexer 102 shown in FIG. 3, and the use of two switches connected to variable resistances may provide up to four distinct gain states for amplifier 96. These and other changes and modifications which are obvious to those skilled in the art are intended to be included within the scope of the present invention.

What is claimed is:

1. A system for indicating weight of an object, said system comprising:
   means for sensing said weight and providing an analog signal having an amplitude responsive to said weight;
   conversion means, coupled to said sensing means, for converting said analog signal into a load oscillation signal having a frequency responsive to said weight;
   counting means, coupled to said conversion means, for monitoring said oscillation signal to provide a monitored load count which is responsive to said weight;
   computing means, coupled to said counting means, for converting said monitored load count into a weight code which is responsive to said weight;
   display means, coupled to said computing means, for converting said weight code into a humanly perceptible indication of said weight; and
   memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said firs calibration weight being associated with a first one of said calibration load counts that is greater than said monitored load count, and said second calibration weight being associated with a second one of said calibration load counts that is less than said monitored load count.

2. A system as claimed in claim 1 wherein said memory means is additionally configured so that when said computing means executes said program, said computing means selects said first and second calibration load counts from a calibration table stored in said memory means so that no calibration load counts in said calibration table are greater than said monitored load count and less than said first load count, and so that no calibration load counts in said calibration table are less than said monitored load count and greater than said second load count.

3. A system as claimed in claim 1 wherein:
said system additionally comprises means for supplying a tare identification signal to said computing means; and
said memory means is additionally configured so that when said computing means executes said program, said computing means calculates said weight code based upon a tare weight value calculated by said computing means in response to said tare identification signal.

4. A system for indicating weight of an object, said system comprising:
means for sensing said weight and providing an analog signal having an amplitude responsive to said weight;
conversion means, coupled to said sensing means, for converting said analog signal into a load oscillation signal having a frequency responsive to said weight;
counting means, coupled to said conversion means, for monitoring said oscillation signal to provide a monitored load count which is responsive to said weight;
computing means, coupled to said counting means, for converting said monitored load count into a weight code which is responsive to said weight;
display means, coupled to said computing means, for converting said weight code into a humanly perceptible indication of said weight;
memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count;
said system additionally comprises supply means for providing an excitation signal to said sensing means;
said system additionally comprises means for coupling said supply means to said conversion means so that said conversion means additionally provides an excitation oscillation signal having a frequency responsive to said excitation signal and so that said counting means additionally provides a monitored excitation count responsive to said excitation signal; and
said memory means is additionally configured so that a calibration excitation count is associated with said calibration load counts so that when said computing means executes said program, said computing means compensates said monitored load count for variance between said calibration and monitored excitation counts.

5. A system for indicating weight of an object, said system comprising:
means for sensing said weight and providing an analog signal having an amplitude responsive to said weight;
conversion means, coupled to said sensing means, for converting said analog signal into a load oscillation signal having a frequency responsive to said weight;
counting means, coupled to said conversion means, for monitoring said oscillation signal to provide a monitored load count which is responsive to said weight;
computing means, coupled to said counting means, for converting said monitored load count into a weight code which is responsive to said weight;
display means, coupled to said computing means, for converting said weight code into a humanly perceptible indication of said weight;
memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count;
said system additionally comprises switching means coupled to said sensing means;
said system additionally comprises amplifying means coupled to said switching means and said conversion means so that said switching means selectively provides one of said analog signal or a null signal to said amplifying means, so that said conversion means additionally provides a null oscillation signal having a frequency responsive to said null signal, and so that said counting means additionally provides a monitored null count responsive to said null signal; and
said memory means is additionally configured so that a calibration null count is associated with said calibration load counts and so that when said computing means executes said program, said computing means compensates said monitored load count for variance between said calibration and monitored null counts.

6. A system for indicating weight of an object, said system comprising:

means for sensing said weight and providing an analog signal having an amplitude responsive to said weight;

conversion means, coupled to said sensing means, for converting said analog signal into a load oscillation signal having a frequency responsive to said weight;

counting means, coupled to said conversion means, for monitoring said oscillation signal to provide a monitored load count which is responsive to said weight;

computing means, coupled to said counting means, for converting said monitored load count into a weight code which is responsive to said weight;

display means, coupled to said computing means, for converting said weight code into a humanly perceptible indication of said weight;

memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count;

said system additionally comprises temperature sensing means located in the vicinity of said weight sensing means;

said system additionally comprises means for coupling said temperature sensing means to said conversion means so that said conversion means additionally provides a temperature oscillation signal having a frequency responsive to a temperature experienced by said temperature sensing means and so that said counting means additionally provides a monitored temperature count responsive to said temperature; and said memory means is additionally configured so that when said computing means executes said program, said computing means compensates said monitored load count for variance in said analog signal caused by operating said weight sensing means at approximately said temperature.

7. A system for indicating weight of an object, said system comprising:

means for sensing said weight and providing an analog signal having an amplitude responsive to said weight;

conversion means, coupled to said sensing means, for converting said analog signal into a load oscillation signal having a frequency responsive to said weight;

counting means, coupled to said conversion means, for monitoring said oscillation signal to provide a monitored load count which is responsive to said weight;

computing means, coupled to said counting means, for converting said monitored load count into a weight code which is responsive to said weight;

display means, coupled to said computing means, for converting said weight code into a humanly perceptible indication of said weight;

memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count;

said system additionally comprises supply means for providing an excitation signal to said sensing means;

said system additionally comprises switching means coupled to said sensing means and to said supply means;

said system additionally comprises amplifying means coupled to said switching means and said conversion means so that said switching means selectively provides one of said analog signal, said excitation signal, and a null signal to said amplifying means, so that said conversion means additionally provides an excitation oscillation signal and a null oscillation signal having frequencies responsive to said excitation signal and said null signal, respectively, and so that said counting means additionally provides a monitored excitation count and a monitored null count responsive to said excitation and null signals, respectively; and said memory means is additionally configured so that a calibration excitation count and a calibration null count is associated with said calibration load counts so that when said computing means executes said program, said computing means compensates said monitored load count for variance between said calibration and monitored excitation counts and for variance between said calibration and monitored null counts.

8. The system of claim 7 wherein said memory means is additionally configured so that when said computing means executes said program, said computing means causes said counting means to provide a multiplicity of monitored load counts for each monitored excitation count and each monitored null count.

9. A system for indicating weight of an object, said system comprising:

means for sensing said weight and providing an analog signal having an amplitude responsive to said weight;

conversion means, coupled to said sensing means, for converting said analog signal into a load oscillation signal having a frequency responsive to said weight;

counting means, coupled to said conversion means, for monitoring said oscillation signal to provide a monitored load count which is responsive to said weight;

computing means, coupled to said counting means, for converting said monitored load count into a weight code which is responsive to said weight;

display means, coupled to said computing means, for converting said weight code into a humanly perceptible indication of said weight;

memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count; and said counting means is configured to monitor said frequency for a predetermined duration which is approximately an integral multiple of periods for each of 50 Hz, 60 Hz and 400 Hz signals.

10. The system of claim 9 wherein said counting means is configured so that said duration is approximately 400 msec.

11. A system for indicating weight of an object, said system comprising:

means for sensing said weight and providing an analog signal having an amplitude responsive to said weight;

conversion means, coupled to said sensing means, for converting said analog signal into a load oscillation signal having a frequency responsive to said weight;

counting means, coupled to said conversion means, for monitoring said oscillation signal to provide a monitored load count which is responsive to said weight;

computing means, coupled to said counting means, for converting said monitored load count into a weight code which is responsive to said weight;

display means, coupled to said computing means, for converting said weight code into a humanly perceptible indication of said weight;

memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count; and filtering means coupled between said sensing means and said conversion means to reduce the influence of noise on operation of said conversion means.

12. A system for indicating weight of an object, said system comprising:

means for sensing said weight and providing an analog signal having an amplitude responsive to said weight;

conversion means, coupled to said sensing means, for converting said analog signal into a load oscillation signal having a frequency responsive to said weight;

counting means, coupled to said conversion means, for monitoring said oscillation signal to provide a monitored load count which is responsive to said weight;

computing means, coupled to said counting means, for converting said monitored load count into a weight code which is responsive to said weight;

display means, coupled to said computing means, for converting said weight code into a humanly perceptible indication of said weight;

memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count; and means, coupled to said conversion means and said computing means, for automatically establishing a range for said humanly perceptible indication of said weight.

13. The system of claim 12 wherein said automatic range establishing means comprises:

an amplifier having an input coupled to said sensing means and an output coupled to said conversion means;

a terminal adapted to receive a common potential;

a first switching means and a first resistor coupled together in series between said amplifier output and said terminal;

a second switching means and a second resistor coupled together in series between said amplifier output and said terminal; and means for coupling said first and second switching means to said computing means so that said computing means adjusts amplification applied to said analog signal by selectively activating at least one of said first and second switching means.

14. A system for indicating weight of an object, said system comprising:

means for sensing said weight and providing an analog signal having an amplitude responsive to said weight;

conversion means, coupled to said sensing means, for converting said analog signal into a load oscillation signal having a frequency responsive to said weight;

counting means, coupled to said conversion means, for monitoring said oscillation signal to provide a monitored load count which is responsive to said weight;

computing means, coupled to said counting means, for converting said monitored load count into a weight code which is responsive to said weight;

display means, coupled to said computing means, for converting said weight code into a humanly perceptible indication of said weight;

memory means, coupled to said computing means, for storing a program executable by said computing means and for storing a predetermined number of calibration load counts wherein each calibration load count has a calibration weight associated therewith, said memory means being configured so that when said computing means executes said program, said computing means generates said weight code based upon an interpolation between first and second ones of said calibration weights, said first calibration weight being associated with a first one of said calibration load counts that is greater than said monitored load count, and said second calibration weight being associated with a second one of said calibration load counts that is less than said monitored load count;

means, coupled to said computing means for supplying calibration identification values which identify said object weight as being a calibration load that exhibits one of said plurality of calibration weights; and said memory means is additionally configured so that when said computing means executes said program and receives said identification values, said computing means causes said calibration load count associated with said one of said plurality of calibration weights to be overwritten with a count corresponding to said monitored load count.

15. A method for indicating weight of a load, said method comprising the steps of:

sensing said weight and providing an analog signal having an amplitude responsive to said weight;

converting said analog signal into a load oscillation signal having a frequency responsive to said weight;

counting oscillations of said load oscillation signal for a predetermined duration to produce a monitored load count which is responsive to said weight;

storing a plurality of calibration load counts wherein each of said calibration load counts has a calibration weight associated therewith;

calculating a monitored weight value by interpolating between a first calibration weight which is associated with a first one of said plurality of calibrated load counts that is less than said monitored load count and a second calibration weight which is associated with a second one of said plurality of calibrated load counts that is greater than said monitored load count; and converting said monitored weight value into a humanly perceptible indication of said weight.

16. A method for indicating weight of a load, said method comprising the steps of:

sensing said weight and providing an analog signal having an amplitude responsive to said weight;

converting said analog signal into a load oscillation signal having a frequency responsive to said weight;

counting oscillations of said load oscillation signal for a predetermined duration to produce a monitored load count which is responsive to said weight;

storing a plurality of calibration load counts wherein each of said calibration load counts has a calibration weight associated therewith;

calculating a monitored weight value by interpolating between a first calibration weight which is associated with a first one of said plurality of calibrated load counts that is less than said monitored load count and a second calibration weight which is associated with a second one of said plurality of calibrated load counts that is greater than said monitored load count;

converting said monitored weight value into a humanly perceptible indication of said weight; and said counting step counts oscillations of said oscillation signal for a duration that is approximately an integral multiple of periods for each of 50 Hz, 60 Hz, and 400 Hz signals.

17. A method for indicating weight of a load, said method comprising the steps of:

sensing said weight and providing an analog signal having an amplitude responsive to said weight;

converting said analog signal into a load oscillation signal having a frequency responsive to said weight;

counting oscillations of said load oscillation signal for a predetermined duration to produce a monitored load count which is responsive to said weight;

storing a plurality of calibration load counts wherein each of said calibration load counts has a calibration weight associated therewith;

calculating a monitored weight value by interpolating between a first calibration weight which is associated with a first one of said plurality of calibrated load counts that is less than said monitored load count and a second calibration weight which is associated with a second one of said plurality of calibrated load counts that is greater than said monitored load count;

converting said monitored weight value into a humanly perceptible indication of said weight;

said sensing step utilizes an excitation signal so that said analog signal is responsive both to said weight and said excitation signal;

said converting step additionally converts said excitation signal into an excitation oscillation signal having a frequency responsive to said excitation signal;

said counting step additionally counts oscillations of said excitation oscillation signal for said predetermined duration to produce a monitored excitation count which is responsive to said excitation signal;

said storing step additionally stores a calibration excitation count associated with said calibration load counts; and said calculating step calculates said monitored weight value by compensating said monitored load count for variance between said calibration and monitored excitation counts.

18. A method for indicating weight of a load, said method comprising the steps of:

sensing said weight and providing an analog signal having an amplitude responsive to said weight;

converting said analog signal into a load oscillation signal having a frequency responsive to said weight;

counting oscillations of said load oscillation signal for a predetermined duration to produce a monitored load count which is responsive to said weight;

storing a plurality of calibration load counts wherein each of said calibration load counts has a calibration weight associated therewith;

calculating a monitored weight value by interpolating between a first calibration weight which is associated with a first one of said plurality of calibrated load counts that is less than said monitored load count and a second calibration weight which is associated with a second one of said plurality of calibrated load counts that is greater than said monitored load count;

converting said monitored weight value into a humanly perceptible indication of said weight;

said converting step additionally converts a null signal into an null oscillation signal having a frequency related to said null signal;

said counting step additionally counts oscillations of said null oscillation signal for said predetermined duration to produce a monitored null count which is related to said null signal;

said storing step additionally stores a calibration null count associated with said calibration load counts; and said calculating step calculates said monitored weight value by compensating said monitored load count for variance between said calibration and monitored null counts.

19. The method of claim 18 wherein said sensing step utilizes an excitation signal so that said analog signal is responsive both to said weight and said excitation signal;

said converting step additionally converts said excitation signal into an excitation oscillation signal having a frequency responsive to said excitation signal;

said counting step additionally counts oscillations of said excitation oscillation signal for said predetermined duration to produce a monitored excitation count which is responsive to said excitation signal;

said storing step additionally stores a calibration excitation count associated with said calibration load counts; and said calculating step calculates said monitored weight value by additionally compensating said monitored load count for variance between said calibration and monitored excitation counts.

20. The method of claim 19 wherein said counting step produces a multiplicity of monitored load counts for each monitored null count and each monitored excitation count.

21. A method as claimed in claim 15 additionally comprising the steps of:

supplying a calibration identification value which identifies said load as being a calibration load that exhibits one of said calibration weights; and storing a count corresponding to said monitored load count as a calibration load count which is associated with said one of said calibration weights in response to said calibration identification value.

22. A method as claimed in claim 15 additionally comprising the steps of:

selectively supplying a tare identification signal;

storing the monitored weight value of said calculating step as a tare weight value in response to application of said tare identification signal; and subtracting said tare weight value from said monitored weight value when said tare identification signal is not applied.

* * * * *